(12) United States Patent  (10) Patent No.: US 9,349,500 B2
Koemmelt et al.  (45) Date of Patent: May 24, 2016

(54) REACTIVE RESINS FOR CABLE SEALING COMPOUNDS

(75) Inventors: Sabine Koemmelt, Darmstadt (DE); Gerold Schmitt, Aschaffenburg (DE); Thorben Schuetz, Alsbach-Haehnlein (DE); Martina Ebert, Dieburg (DE); Volker Herzog, Darmstadt (DE); Joachim Knebel, Alsbach-Haehnlein (DE); Mario Gomez Andreu, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 30 days.

(21) Appl. No.: 14/111,773

(22) PCT Filed: May 21, 2012

(86) PCT No.: PCT/EP2012/059318
§ 371 (c)(1),
(2), (4) Date: Oct. 15, 2013

(87) PCT Pub. No.: WO2012/160007
PCT Pub. Date: Nov. 29, 2012

(65) Prior Publication Data
US 2014/0045993 A1  Feb. 13, 2014

(30) Foreign Application Priority Data
May 24, 2011 (DE) .......... 10 2011 076 419

(51) Int. Cl.
*H01B 3/44* (2006.01)
*C08F 222/10* (2006.01)

(52) U.S. Cl.
CPC .............. *H01B 3/447* (2013.01); *C08F 222/10* (2013.01); *C08F 2222/108* (2013.01)

(58) Field of Classification Search
CPC .. C08F 2222/108; C08F 222/10; H01B 3/447
See application file for complete search history.

(56) References Cited

U.S. PATENT DOCUMENTS

| 3,043,820 A * | 7/1962 | Krieble | 526/320 |
| 4,600,738 A * | 7/1986 | Lamm et al. | 523/500 |
| 4,624,725 A * | 11/1986 | Lamm et al. | 156/310 |
| 5,514,521 A * | 5/1996 | Kobayashi | 430/281.1 |
| 5,567,741 A * | 10/1996 | Casey et al. | 521/133 |
| 5,688,601 A * | 11/1997 | Usifer et al. | 428/457 |

(Continued)

FOREIGN PATENT DOCUMENTS

| CN | 1226589 A | 8/1999 |
| CN | 101058699 A | 10/2007 |

(Continued)

OTHER PUBLICATIONS

International Search Report Issued Aug. 10, 2012 in PCT/EP12/59318 Filed May 21, 2012.

(Continued)

*Primary Examiner* — Michael A Salvitti
(74) *Attorney, Agent, or Firm* — Oblon, McClelland, Maier & Neustadt, L.L.P.

(57) ABSTRACT

The invention describes a composition, especially in the form of a 2-component system comprising (meth)acrylated polyether polyols and/or polyester polyols and/or (meth)acrylated hydroxy-functionalized triglycerides with an adjustable pot life, especially for cable potting compounds.

26 Claims, 1 Drawing Sheet

(56) References Cited

U.S. PATENT DOCUMENTS

| | | | |
|---|---|---|---|
| 6,624,223 B1 * | 9/2003 | Thames et al. | 524/398 |
| 6,653,381 B2 * | 11/2003 | Thames et al. | 524/398 |
| 2003/0195297 A1 * | 10/2003 | Burghart et al. | 525/191 |
| 2005/0250038 A1 * | 11/2005 | McAneney et al. | 430/124 |
| 2011/0045723 A1 * | 2/2011 | Nowak et al. | 442/54 |
| 2011/0082252 A1 * | 4/2011 | Koschabek et al. | 524/558 |
| 2012/0125685 A1 * | 5/2012 | Lamb | 174/84 R |
| 2012/0232222 A1 * | 9/2012 | Schutz et al. | 525/330.6 |
| 2013/0289164 A1 * | 10/2013 | Hilf et al. | 523/172 |
| 2014/0045993 A1 * | 2/2014 | Koemmelt et al. | 524/853 |

FOREIGN PATENT DOCUMENTS

| | | |
|---|---|---|
| DE | 15 69 862 | 7/1969 |
| GB | 1 256 582 | 12/1971 |
| JP | 52-27176 | 7/1977 |
| JP | 62-1772 | 1/1987 |
| JP | 2002-80545 | 3/2002 |
| JP | 2003-193032 | 7/2003 |
| JP | 2009-292890 | 12/2009 |
| WO | WO 2013/092072 A1 | 6/2013 |

OTHER PUBLICATIONS

U.S. Appl. No. 14/351,667, filed Apr. 14, 2014, Knebel, et al.
International Preliminary Report on Patentability and Written Opinion issued Dec. 5, 2013 in PCT/EP2012/059318 (with English language translation).
Combined Office Action and Search Report issued Mar. 16, 2015 in Chinese Patent Application No. 201280019635.5 (with English language translation).
Hui-lu Li, et al., "Study on influence factors of anaerobic adhesives properties for thread-locking", China Adhesives, vol. 20, No. 4, (Apr. 2011), pp. 31-35.
Japanese Office Action issued Nov. 24, 2015, in Japanese Patent Application No. 2014-511827 (with English-language Translation).

* cited by examiner

REACTIVE RESINS FOR CABLE SEALING COMPOUNDS

CROSS REFERENCE TO RELATED APPLICATIONS

The present application is a 35 U.S.C. §371 national stage patent application of International patent application PCT/EP2012/059318, filed on May 21, 2012, published as WO/2012/160007 on Nov. 29, 2012, the text of which is incorporated by reference, and claims the benefit of the filing date of German application no. 102011076419.4, filed on May 24, 2011, the text of which is also incorporated by reference.

The invention describes compositions, especially in the form of a 2-component system comprising (meth)acrylated polyether polyols and/or polyester polyols and/or (meth) acrylated hydroxy-functionalized triglycerides with adjustable pot life, especially for cable potting compounds.

STATE OF THE ART

Commercially available cable potting compounds are currently based on 2-component polyurethane resins (PUR resins) or on epoxide systems.

A great disadvantage of the PUR systems used is the need to use isocyanates as a hardener component. Isocyanates, particularly MDI (diphenylmethane diisocyanate), are suspected carcinogens.

EP1070730 describes methacrylate-based cable potting compounds in which crosslinking is effected via polyethylene glycol dimethacrylate. WO 2011/012918 describes cable potting compounds comprising urethane acrylate oligomers and epoxy acrylate oligomers as the crosslinker component. A disadvantage here is the use of monomers with a high vapour pressure.

Problem

The problem addressed by the invention was that of providing systems which cure at room temperature and whose curing properties can be influenced in a simple manner. More particularly, the pot life is to be adjustable within wide limits and the composition is nevertheless to rapidly cure completely, for example within 100 min, preferably within less than 50 min, at a defined time without supply of energy.

In addition, it is to be possible that the mechanical properties of the cured resin can be adjusted to the required use conditions and varied in a simple manner, for example by varying the resin components.

A further object to be achieved in accordance with the invention is to minimize shrinkage in the course of curing, and also the odour nuisance resulting from the constituents used.

Another objective was to avoid the disadvantage that, when the polyurethane systems known from the prior art are used as a potting compound, the adhesion between the mould shell and the potting compound is high, such that the mould shells have to date remained in place as a lining constituent around the potting compound, i.e. can no longer be removed. Compositions which enter into only a slight adhesive bond, if any, with the shell and cure rapidly and without excessive evolution of heat were to be provided, such that the shell can be used again as a mould.

Moreover, the use of isocyanate compounds shall be avoided.

Solution

Figure 1:
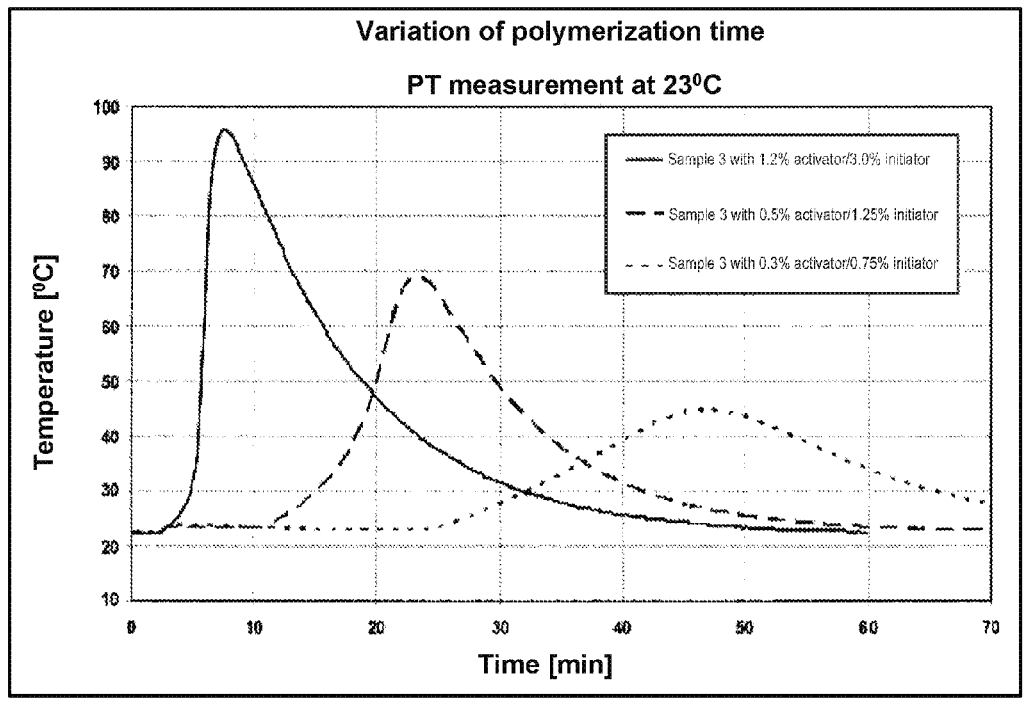
FIG. 1 shows a variation of polymerization time (PT) using the example of Sample 3.
Figure 2:
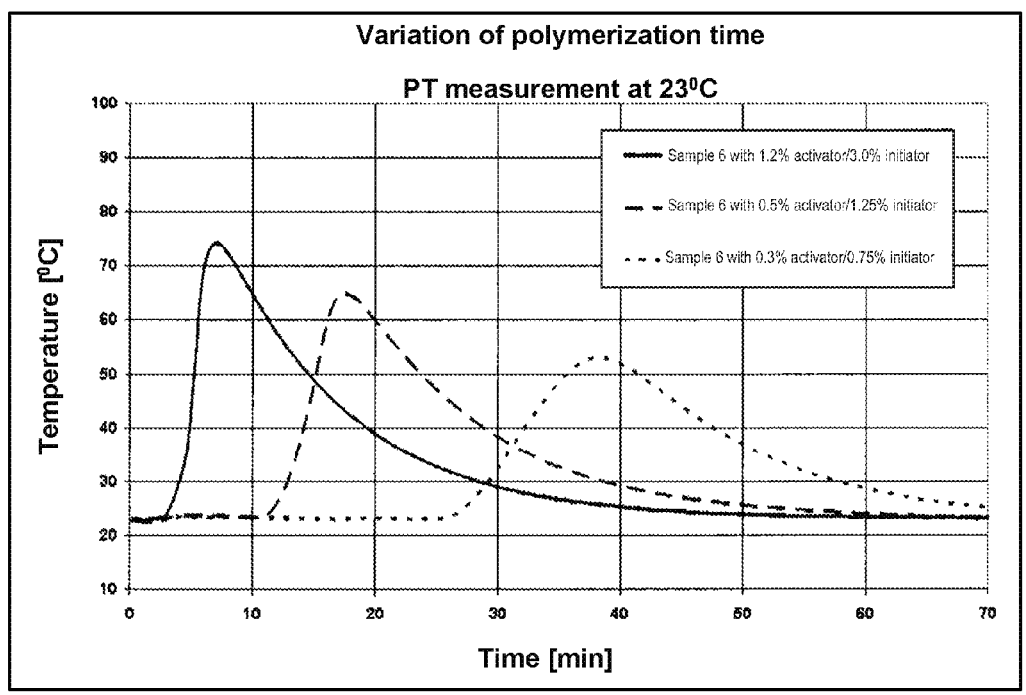
FIG. 2 shows a variation of polymerization time (PT) using the example of Sample 6.

These objects, and further objects which are not stated explicitly but are immediately derivable or discernible from the connections discussed herein by way of introduction, are achieved by compositions having all features of claim 1.

Appropriate modifications of the inventive compositions, for example the configuration of the compositions as a 2-component system or the use of the compositions, are protected in the dependent claims referring back to claim 1.

It has been found that, surprisingly, it is possible to dispense with the use of cyanates with the inventive composition without worsening the processability of the composition, for example the pot life.

It has also been found that the compositions, especially when used as cable potting compounds, are notable for particularly low water absorption.

It has also been found that the high molecular weight of the components used leads to a low vapour pressure in the composition. The prior art 2-component systems comprising methacrylates are classified as irritant since exposure is increased as a result of the relatively high vapour pressure of the monomers in the course of processing.

Moreover, it has been found that the inventive mixtures, after polymerization, have a lower shrinkage than the methacrylate systems on the market.

Through the amount of initiator and activator used, the pot life can be varied within a wide range. Depending on the ambient temperature and the stabilization of the individual components, the pot life can be optimized through the amount of initiator and/or activator. For this purpose, particularly the polymerization time measurement (PT measurement) described in the appendix gives the user a simple screening method with which, by a small number of test series, the optimum can be found for the end use thereof in respect of processing time of the components mixed (pot life) and curing rate. More particularly, the temperature evolution and maximum temperature in the course of polymerization of the compound can be estimated and controlled. The values determined in the PT measurement in the preliminary test correlate very well with the curing parameters of a mixture of corresponding composition under use conditions.

The (meth)acrylated polyether polyols, (meth)acrylated polyester polyols or (meth)acrylated hydroxy-functionalized triglycerides used in the context of the present invention are prepared by reaction of suitable (meth)acrylic acid compounds with polyether polyols, polyester polyols or hydroxy-functionalized triglycerides. This can be accomplished, for example, by acid-catalysed esterification of these compounds with (meth)acrylic acid or by transesterification. For transesterification of the polyols with (meth)acrylates, the transesterification catalysts known to those skilled in the art can be used. Particularly suitable systems are those described in DE 3423443, EP 1924547, EP2162423, EP2294048 and DE102010009485.

The notation "(meth)acrylate" here means both methacrylate, for example methyl methacrylate, ethyl methacrylate, etc., and acrylate, for example methyl acrylate, ethyl acrylate, etc., and mixtures of the two.

Polyether polyols are typically the product of polymerization of epoxides, such as ethylene oxide (EO), propylene oxide (PO), butylene oxide, styrene oxide or epichlorohydrin, with themselves or by addition of these epoxides, optionally in a mixture or successively, onto starter components with reactive hydrogen atoms, such as water, alcohols, ammonia or amines. Such starter molecules generally have a functionality of 1 to 8. Examples of such starting compounds are di- to octafunctional hydroxyl compounds, such as polyhydric alcohols, especially diols such as ethylene glycol, 1,2-propylene glycol, 1,3-propylene glycol, diethylene glycol, dipropylene glycol, 1,4-butylene glycol and 1,6-hexamethylene glycol, triols such as glycerol and trimethylolpropane, tetraols such as pentaerythritol, hexaols such as sorbitol, and octaols such as sucrose. Depending on the process regime, these polyether polyols may be homopolymers, block copolymers or randomly distributed copolymers.

Conventional polyester polyols in this context are those which are formed entirely or predominantly from polycarboxylic acids or derivatives thereof having at least 2 and at most 6, preferably 4, carboxyl groups and a total of 4 to 12 carbon atoms, i.e., for example, adipic acid, glutaric acid, succinic acid, phthalic acid, etc., and which are prepared at temperatures of $\geq 180°$ C. with elimination of water or of a low molecular weight, normally monofunctional alcohol. Typical catalysts here are, for example, tin compounds or titanium compounds. Processes for preparation of and properties of the polyester polyols for polyurethanes, for example, are described in numerous patent and literature publications. Examples include Kunststoffhandbuch [Polymer Handbook], volume VII, Polyurethane, Carl-Hanser-Verlag, Munich, 1st edition 1966, edited by Dr R. Vieweg and Dr A. Höchtlen, and 2nd edition 1983 and 3rd edition 1993, edited by Dr G. Oertel.

The hydroxy-functionalized triglycerides used may be either naturally occurring hydroxy-functionalized triglycerides or semisynthetic hydroxy-functionalized triglycerides.

Examples of naturally occurring raw materials are castor oil, lesquerella oil, polyhydroxy fatty acid, ricinoleic acid, oils modified with hydroxyl groups, such as grapeseed oil, black cumin oil, pumpkinseed oil, borage seed oil, soya oil, wheatgerm oil, rapeseed oil, sunflower oil, peanut oil, apricot kernel oil, pistachio oil, almond oil, olive oil, macadamia nut oil, avocado oil, sallow thorn oil, sesame oil, hemp oil, hazelnut oil, evening primrose oil, wild rose oil, safflower oil, walnut oil, fatty acids and fatty acid esters modified with hydroxyl groups and based on myristoleic acid, palmitoleic acid, oleic acid, vaccenic acid, petroselic acid, gadoleic acid, erucic acid, nervonic acid, linoleic acid, linolenic acid, stearidonic acid, arachidonic acid, timnodonic acid, clupanodonic acid, cervonic acid.

Particular preference is given to castor oil, which occurs in the seeds of the castor oil plant which is grown in large volumes in many parts of the world, for example in India, Brazil and China. Castor oil is unique among the seed oils in that it consists predominantly of an unsaturated $C_{18}$ fatty acid containing one hydroxyl group, called ricinoleic acid.

Natural castor oil has a functionality of about 2.7 OH groups/mol and an OH number of at least 160 mg KOH/g. The acid content of natural castor oil is max. 2 mg KOH/g. The mean molar mass of castor oil is in the range of greater than 800 g/mol, especially in the range of 800-2000 g/mol, preferably in the range of 820-1500 g/mol and more preferably in the range of 850-1200 g/mol. Castor oil may consist of a mixture of glycerides of fatty acids such as ricinoleic acid, oleic acid, linoleic acid, stearic acid or dihydroxystearic acid. According to the origin of the castor oil, it may also be advantageous to use a partly hydrogenated castor oil for the subsequent (meth)acrylation. Particular preference is given to the use of a castor oil containing at least 85% by weight, preferably at least 90% by weight, of ricinoleic acid glyceride.

For example, it is also possible to obtain hydroxy-functionalized triglycerides by epoxidation of unsaturated triglycerides and subsequent hydrolysis.

The mechanical properties of the potting compounds can be adjusted by using individual compounds of the (meth)acrylated polyols or by the use of suitable mixtures of the above-described different (meth)acrylated polyols. Polyols with high molecular weight and low hydroxyl number lead to a relatively low crosslinking density as a result of the long molecule regions between the branching points, and the ultimately resulting potting compound is softer. Polyols with relatively low molar mass and a high hydroxyl number result in a harder potting compound as a result of the higher crosslinking density and the shorter molecule length between the individual branching points. According to the requirements on the potting compound (hardness, desired curing rate), the potting compound, optionally with reference to the polymerization time measurement, can be adjusted accordingly in relation to the proportions of the polyol components and mixing ratios. In a particular embodiment, a potting compound is formed from several (meth)acrylated polyols, preferably from a mixture of at least two different (meth)acrylated compounds of component a). This mixture may consist, for example, of two different representatives of the different compound classes, for example mixtures of in each case one (meth)acrylated polyether/polyester, polyether/hydroxy-functionalized triglyceride or polyester/hydroxy-functionalized triglyceride. In the same way, however, it is also possible to use two or more structurally different representatives of a single compound class in a mixture, for example two or more polyethers each with different molecular weight and/or hydroxyl number, two or more polyesters each with different molecular weight and/or hydroxyl number, or two or more hydroxy-functionalized triglycerides each with different molecular weight and/or hydroxyl number. In particular embodiments, it is also possible to use two or more different representatives of different compound classes and two or more structurally different representatives of a single compound class in a mixture.

Advantageous mixtures include, for example, a polyether polyol which, prior to the (meth)acrylation, has generally a mean molar mass of 230-650 g/mol and a mean hydroxyl number of 220-500 mg KOH/g, preferably a mean molar mass of 300-500 g/mol and a mean hydroxyl number of 300-450 mg KOH/g, and especially a mean molar mass of 400-500 g/mol and a mean hydroxyl number of 340-420 mg KOH/g. While a second polyether polyol, prior to the (meth)acrylation, has generally a mean molar mass of 1000-8000 g/mol and a mean hydroxyl number of 10-180 mg KOH/g, preferably a mean molar mass of 2000-6000 g/mol and a mean hydroxyl number of 25-70 mg KOH/g, and especially a mean molar mass of 4000-5000 g/mol and a mean hydroxyl number of 30-50 mg KOH/g.

If (meth)acrylated polyester polyols are used in the mixture, these have, prior to the (meth)acrylation, generally a mean molar mass of 500-2000 g/mol and a mean hydroxyl number of 40-250 mg KOH/g, preferably a mean molar mass of 600-1500 g/mol and a mean hydroxyl number of 100-220 mg KOH/g, and especially a mean molar mass of 800-1100 g/mol and a mean hydroxyl number of 110-140 mg KOH/g.

If (meth)acrylated hydroxy-functionalized triglycerides are used for the formulation of the mixture, these have, prior to the (meth)acrylation, preferably a mean molar mass of >800 g/mol, especially of 800-2000 g/mol, preferably in the range of 820-1500 g/mol and more preferably in the range of 850-1200 g/mol, and a mean hydroxyl number of 120-250 mg KOH/g, preferably of 150-170 mg KOH/g and especially, for instance, of 160 mg KOH/g. A particularly preferred (meth) acrylated hydroxy-functionalized triglyceride is (meth)acrylated castor oil.

The compositions may optionally also comprise further mono- or polyfunctional monomers if, for example, particular properties of the compound are to be achieved. For this purpose, it is possible to use all vinylically unsaturated compounds which can copolymerize with the inventive monomers a). Nonlimiting examples thereof are methyl(meth)acrylate, ethyl(meth)acrylate, propyl(meth)acrylate, isopropyl(meth)acrylate, butyl(meth)acrylate, isobutyl(meth)acrylate, hexyl(meth)acrylate, ethylhexyl(meth)acrylate, cyclohexyl(meth)acrylate, tetra-hydrofurfuryl(meth)acrylate, isobornyl(meth)acrylate, benzyl(meth)acrylate, phenyl(meth)acrylate, phenylethyl(meth)acrylate, 3,3,5-trimethylcyclohexyl(meth)acrylate, hydroxyalkyl(meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol(meth)acrylate; glycol dimethacrylates such as 1,4-butanediol methacrylate, 2-butoxyethyl methacrylate, 2-ethoxyethoxymethyl methacrylate, 2-ethoxyethyl methacrylate; methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate and ethoxylated (meth)acrylates which have preferably 1 to 20 and especially 2 to 8 ethoxy groups; styrene, substituted styrenes having an alkyl substituent in the side chain, for example alpha-methylstyrene and alpha-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes.

When these compounds are used, they are used only in small amounts due to their higher vapour pressure relative to the (meth)acrylated compounds a). These compounds may be present in the compositions in a total amount of 0-25% by weight, preferably of 0-20% by weight and more preferably of 0-10% by weight, where these percentages are based on the weight of the overall composition and the sum of all constituents, i.e. compounds a) to d) and the further constituents optionally present, must always add up to 100% by weight.

In the specialist field, the curing is considered to be sufficient when a dimensional stability of Shore D of greater than 10 is attained, preference being given to a Shore D hardness of greater than 20 after full curing. This is attained with prior art polyurethane systems only after about 30 minutes, and the adhesion between the mould shell and the potting compound is also found to be high, and so the mould shells have to date remained as a lining constituent around the potting compound, that is to say they are not removed at all.

In contrast, the inventive compositions have the advantage that, when used as potting compounds, they do not enter into any adhesive bond at all with the shell, and cure rapidly and without excessive evolution of heat, and so the shell can be reused as a mould.

Compositions based on the inventive (meth)acrylated polyols enable curing times of 20-30 min with simultaneously moderate reaction temperatures of 30 to 95° C., preferably at 40 to 85° C. and particularly preferably at 50 to 75° C., which are well below the maximum permissible thermal stress for the insulation materials of cables of about 100° C. More particularly, the curing temperature of the composition should not exceed 95° C., preferably 85° C. and more preferably 75° C.

The stabilizers or inhibitors used may be the phenolic or aminic inhibitors known from the prior art, preferably HQME, Tempol or phenothiazine. The stabilizers are generally added to the (meth)acrylated compounds a) in amounts of 1-1000 ppm if they are to be stabilized. In mixtures of different (meth)acrylated compounds a), which may consist either of unstabilized compounds or of compounds with different stabilizer content in each case, the stabilizer content may be between 1 and 1000 ppm, this figure being based on the total amount of compounds a) present in the mixture.

The initiators are used in customary amounts, for example in amounts of 0.01 to 10% by weight, preferably 0.05 to 5% by weight, especially 0.1 to 1.0% by weight, based on the weight of the overall composition. When initiators are used in diluted form, called phlegmatized form, the individual percentage content of initiator therein has to be taken into account in the initial weighing, in order that the aforementioned amount of effective initiator is thus indeed used. The initiators used may be all compounds which decompose to free radicals under the polymerization conditions, for example peroxides, hydroperoxides, hydrogen peroxide, persulphates, azo compounds and what are called redox initiators. In some cases, it is advantageous to use mixtures of different initiators, for example mixtures of hydrogen peroxide and sodium peroxodisulphate or potassium peroxodisulphate. Mixtures of hydrogen peroxide and sodium peroxodisulphate can be used in any desired ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxydicarbonate, dicyclohexyl peroxydicarbonate, di(4-tert-butylcyclohexyl)peroxydicarbonate, dimyristyl peroxydicarbonate, diacetyl peroxydicarbonate, allyl perester, cumyl peroxyneodecanoate, tert-butyl per-3,5,5-trimethylhexanoate, acetylcyclohexylsulphonyl peroxide, dilauryl peroxide, dibenzoyl peroxide and tert-amyl perneodecanoate. Further initiators are azo compounds, for example 2,2'-azobisisobutyronitrile, 2,2'-azobis(2,4-dimethylvaleronitrile) and 2,2'-azobis-(4-methoxy-2,4-dimethylvaleronitrile). Preferred initiators are redox initiator systems. These contain, as an oxidizing component, at least one of the above-specified peroxo compounds, and, as a reducing component, for example, ascorbic acid, glucose, sorbose, ammonium or alkali metal hydrogensulphite, ammonium or alkali metal sulphite, ammonium or alkali metal thiosulphate, ammonium or alkali metal hyposulphite, ammonium or alkali metal pyrosulphite, ammonium or alkali metal sulphide or sodium hydroxy-methylsulphoxylate.

For rapid curing, it is also possible to use amines as accelerators (activators) as well as the peroxides in redox initiator systems, for example dimethyl- or diethylanilines, para-toluidine or the adducts thereof with ethylene oxide (BISOMER PTE, International Speciality Chemicals). The accelerator component is typically added to the potting compound component which does not contain the initiator, or added directly before use in solid, liquid or dissolved form to the initiator-containing potting compound component. As well as this peroxide/amine redox system, it is also possible to use peroxide/cobalt accelerator combinations.

Based on the amount of monomers used in the polymerization, for example, $1 \times 10^{-5}$ to 1 mol % of the reducing component of the redox catalyst is used.

In a particular embodiment, the inventive compositions are used in the form of 2-component systems. In this case, component A may comprise either only initiator or initiator and fillers. Component A here comprises 0.01-10% by weight of initiator and 0-90% by weight of fillers, these percentages being based on the weight of the overall composition consisting of the two components A and B, i.e. compounds a) to d) and any further constituents present. In the case that component A consists only of initiator, this makes up 100% by weight of component A, but, based on the weight of the overall composition, as described above, 0.01-10% by weight. Component B in this embodiment comprises 9.98-99.98% by weight of one or more compounds selected from (meth)acrylated polyether polyols, (meth)acrylated polyester polyols or (meth)acrylated hydroxy-functionalized triglycerides, and 0.01-10% by weight of activator, where these percentages are based on the weight of the overall composition and the sum of all constituents of components A and B, i.e. compounds a) to d) and any further constituents present, must always add up to 100% by weight.

In a further embodiment, component A may comprise 9.98-99.98% by weight of one or more compounds selected from (meth)acrylated polyether polyols, (meth)acrylated polyester polyols or (meth)acrylated hydroxy-functionalized triglycerides, 0.01-10% by weight of initiator and optionally 0-90% by weight of fillers, and component B may comprise 9.98-99.98% by weight of one or more compounds selected from (meth)acrylated polyether polyols, (meth)acrylated polyester polyols or (meth)acrylated hydroxy-functionalized triglycerides and 0.01-10% by weight of activator. In contrast to the above embodiment, the mixture of the (meth)acrylated polyols is present here both in component A and in component B. The above percentages are based on the weight of the overall composition, i.e. the sum of all constituents of components A and B, i.e. compounds a) to d) and any further constituents present, and the sum of all individual values must always add up to 100% by weight.

In a particularly preferred variant of this embodiment, the 2-component system with controllable pot life comprises, as component A), 89.90-99.99% by weight of (meth)acrylated polyether polyols or (meth)acrylated polyester polyols or mixtures of the two, 0.01-10% by weight of initiator and 1-1000 ppm of stabilizer, where the sum of components A must always add up to 100% by weight, and, as component B), 89.90-99.99% by weight of (meth)acrylated polyether polyols or (meth)acrylated polyester polyols or mixtures of the two, 0.01-10% by weight of activator and 1-1000 ppm of stabilizer, where the sum of component B must always add up to 100% by weight, and 0-90% by weight of fillers.

These two embodiments comprising the compounds a) both in component A and in component B, however, are generally unsuitable for prolonged storage.

In a further embodiment, the initiator is dissolved in component A, which comprises a mixture of (meth)acrylated polyols. In that case, component B consists exclusively of activator. In this embodiment, component A may comprise 9.98-99.98% by weight of one or more compounds selected from (meth)acrylated polyether polyols, (meth)acrylated polyester polyols or (meth)acrylated hydroxy-functionalized triglycerides, 0.01-10% by weight of initiator and optionally 0-90% by weight of fillers, and component B may comprise 0.01-10% by weight of activator. The above percentages are based on the weight of the overall composition, i.e. the sum of all constituents of components A and B, i.e. compounds a) to d) and any further constituents present, and the sum of all individual values must always add up to 100% by weight.

In a particular embodiment, a 2-component system is used, comprising 50-85% component A and 15-50% component B, preferably 55-75% component A and 25-45% component B and more preferably 60-70% component A and 30-40% component B, and components A and B may consist of the above-described compositions.

The fillers used may be all mineral fillers known from the prior art, it being possible with preference to use quartz flours, dolomite, sand, chalk, oxides, hydroxides, basic carbonates and carbonates of the alkaline earth metals. The inventive one- or 2-component system can be used either without fillers, or else with a high filler content up to 90% by weight; the fillers may preferably be used in the range of 10-90% by weight, preferably of 30-80% by weight and more preferably of 60-70% by weight. These aforementioned percentages are based on the total weight of the ready-mixed composition.

The inventive compositions are preferably used for production of watertight compounds resistant to electrical breakdown in cavities, especially potting compound for the sealing of electrical cables in cable connection sleeves, or as potting compounds for electronic assemblies.

Typically, the potting compounds are used as 2-component systems. A process for providing a potting compound preferably comprises the following steps:
  a) providing component A in a suitable vessel (can, bag, pot, etc.)
  b) providing component B in a suitable vessel (can, bag, pot, etc.)
  c) mixing the two components before use and filling the cavity to be filled with this mixture with subsequent curing
  d) optional removal of the cavity lining forming the cavity.

The vessels usable for components A and B are well known to those skilled in the art. As well as cans, bags and pots made of any material, it is especially possible to use polymeric material bags. These are also occasionally referred to as tubular bags or portion bags.

In an advantageous use form, the vessel for components A and B consists of a single bag of polymeric material which contains the two components in separate chambers. This can be accomplished either through a suitably positioned weld seam or, for example, by means of a mini-clamp or a separation clamp. After mechanical removal of the region separating the two components, for example by tearing open or forcing open the separating weld seam, releasing the mini-clamp or separation clamp, etc., mixing of the two components in the bag is possible, for example by vigorous kneading, and the cavity to be filled can be cast with this mixture.

The mould shells to be used are known to those skilled in the art, and it is possible in the context of the invention to use all kinds of mould shells known from the prior art.

EXAMPLES 1.1. Synthesis of the Methacrylated Main Components

Polyols used:
Castor oil (from Roth)

ISO-Pol T35 polyether polyol (from Isoelektra) Mw=4800 g/mol, OHN=35 mg KOH/g (according to manufacturer)

ISO-Pol T400 polyether polyol (from Isoelektra) Mw=450 g/mol, OHN=400 mg KOH/g (according to manufacturer)

P-1010 polyester polyol (from Kuraray) Mw=1000 g/mol, OHN=112 mg KOH/g (according to manufacturer)

The polyols were transesterified with methyl methacrylate to DE3423443, and the OH groups were virtually completely methacrylated. The OH numbers after the reaction were, according to the mixture, between 1.6 and 5.6 mg KOH/g (see Table 1).

Example

Synthesis of a Methacrylated Polyether Polyol

A mixture of 430.0 g of ISO-POL T35 polyether polyol, 450.0 g of methyl methacrylate, 0.09 g of hydroquinone monomethyl ether, 0.009 g of 4-hydroxy-2,2,6,6-tetra-methylpiperidine 1-oxyl and, as a catalyst, a mixture of 0.88 g of calcium oxide and 0.18 g of lithium hydroxide is initially charged in a 2 l four-neck round-bottom flask with a sabre stirrer, an inlet tube for compressed air, a 30 cm column with random packing, an automatic column head, bottom and top thermometers and a heating mantle. The reaction mixture is heated to boiling with introduction of air. At a top temperature of approx. 85° C., the methyl methacrylate/MeOH azeotrope is removed at a reflux ratio of 50:1. During the reaction, the top temperature rises gradually; on attainment of a top temperature of 100° C., the reaction is ended. During the reaction, the conversion is determined by measuring the refractive index ($n_D^{20}$).

After the reaction has ended, the excess methyl methacrylate is removed by reducing the pressure down to 20 mbar at a bottom temperature of up to 115° C. The mixture is cooled to room temperature and filtered. A clear, yellowish product is obtained.

The further polyols were converted analogously to the example described with adjustment of the catalyst and reaction conditions.

1.2. Determination of the OH Number (=Hydroxyl Number, OHN)

Determined via the titrimetric method with acetic anhydride according to DIN 53240-2.

1.3. Production of the Reactive Resins

Monomers:
Methacrylated castor oil (from Roth)
Methacrylated polyether polyols (ISO-Pol T35 and ISO-Pol T400, from Isoelektra)
Methacrylated polyester polyol (P-1010, from Kuraray)
Initiator: 1-3% by weight of 50% benzoyl peroxide (BP-50FT, from Fluka)
Activator: 0.4-1% by weight of N-ethoxylated p-toluidine (PT25E/2, from Saltigo)
Stabilization: 450 ppm of HQME For the different samples, the main components (for compositions see Table 1) were weighed in and the mixtures were homogenized on a roller bed for three hours.

1.4. Bulk Polymerization and Determination of the Polymerization Time (PT Measurement)

The monomers were equilibrated to the appropriate measurement temperature (T=23° C.) in a water bath or in a climate-controlled room for at least 2 h. Initiator (BP-50-FT, figures stated are based on starting weight of the 50 percent supply form) and activator (PT25E/2) were dissolved separately in one half each of the monomer or monomer mixture in separate beakers. These two mixtures were combined, homogenized on a magnetic stirrer for 2 min and transferred into a test tube (18×180 mm), and then the polymerization time was measured. With the aid of a temperature sensor, the temperature profile of the reaction was recorded. This temperature sensor is within a second, smaller tube filled with diethylene glycol as a transfer fluid, which is fixed in the middle of the test tube such that it is immersed low enough into the sample liquid to enable an exact measurement of the sample temperature. The start of the measurement is considered to be the time of combination of the redox components. The position of the maximum reaction temperature $T_{max}$ corresponds to the polymerization time.

1.5. Swelling Studies in Water

Discs were cut out of the polymers from the polymerization time measurement, so as to give cylindrical specimens (d=15 mm, h=5 mm). These were weighed on an analytical balance in a Petri dish as a weighing aid. This was followed by storage in 400 ml of dist. water in beakers (wide form) at room temperature. At regular intervals, the specimens were removed, dabbed dry with cellulose and weighed again.

After a total storage time of 7 days, the samples were re-dried at 80° C. in a drying cabinet overnight (approx. 14 h) and weighed again.

The values obtained were used to calculate solvent absorption (Solv. absorption), weight loss and true swelling as follows.

$$\text{Solv. absorption} = \frac{m_3 - m_2}{m_2 - m_1} \times 100\%$$

$$\text{Weight loss} = \frac{m_2 - m_4}{m_2 - m_1} \times 100\%$$

$$\text{True swelling} = \frac{m_3 - m_4}{m_4 - m_1} \times 100\%$$

$$\text{or } \frac{\text{solv. absorption [\%]} + \text{weight loss [\%]}}{100\% - \text{weight loss [\%]}} \times 100\%$$

where
$m_1$=weight of the empty Petri dish (as a weighing aid)
$m_2$=weight of the Petri dish with the sample prior to water storage
$m_3$=weight of the Petri dish with the sample after water storage (7 days)
$m_4$=weight of the Petri dish with the sample after re-drying at 80° C.

1.6. Assessment of the Hardness of the Polymers

1.6.1. Visual Assessment

All polymers from the PT measurement were freed from the glass from the test tube, and hardness and consistency were assessed.

1.6.2. Shore Hardness

For this purpose, a slab polymerization was conducted in chambers made of glass plates with 5 mm round cord. The reaction mixtures were produced as described under 1.4. and then introduced into the prepared chambers. They were allowed to cure therein at room temperature for approx. 2 h. The Shore hardness was subsequently measured to ISO 868.

TABLE 1

Composition and properties of samples 1-8

| Sample | | 1 | 2 | 3 | 4 | 5 | 6 | 7 | 8 |
|---|---|---|---|---|---|---|---|---|---|
| meth. castor oil [% by wt.] | | 100 | 50.00 | 50.00 | 33.34 | | | | |
| meth. ISO-POL T35 [% by wt.] | | | 50.00 | | 33.33 | | | 100 | |
| meth. ISO-POL T400 [% by wt.] | | | | 50.00 | 33.33 | | 33.34 | 100 | 100 |
| meth. polyester (P-1010) [% by wt.] | | | | | | 100 | 33.33 | | |
| OH number [mg KOH/g] | | 2.4 | 1.6 | 3.1 | 2.3 | 5.6 | 3.3 | <1 | 3.3 |
| PT measurement: 1.2% by wt. of activator/3.0% by wt. of initiator | Time [min] | 10.5 | 12.0 | 7.5 | 7.7 | 8.0 | 7.0 | 19.5 | 6.0 |
| | Tmax [° C.] | 82.1 | 56.8 | 96.1 | 78.9 | 67.4 | 74.2 | 36.4 | 108 |
| Visual assessment of the polymer | | hard, not tacky | rel. hard, not tacky | hard, not tacky | hard, not tacky | hard, not tacky | hard, not tacky | rel. hard, not tacky | hard |
| Shore hardness | D | 29 | 18 | 63 | 38 | 17 | 35 | too soft | 81 |
| | A | too hard | 85 | too hard | too hard | 85 | 95 | 70 | too hard |
| Water absorption [%] ($H_2O$, 7 d) | | 0.84 | 1.98 | 0.59 | 1.59 | 0.43 | 1.41 | 5.49 | 1.04 |
| Weight loss [%] ($H_2O$, 7 d) | | 0.99 | 1.37 | 0.44 | 0.89 | 1.48 | 1.37 | 1.89 | 0.53 |
| True swelling [%] ($H_2O$, 7 d) | | 1.85 | 3.40 | 1.03 | 2.47 | 1.94 | 2.82 | 7.52 | 1.88 |

TABLE 2

Influence of activator/initiator concentration on polymerization time

| Sample | | 3 | 6 |
|---|---|---|---|
| meth. castor oil [% by wt.] | | 50.00 | |
| meth. ISO-POL T35 [% by wt.] | | | 33.34 |
| meth. ISO-POL T400 [% by wt.] | | 50.00 | 33.33 |
| meth. polyester (P-1010) [% by wt.] | | | 33.33 |
| OH number [mg kOH/g] | | 3.1 | 3.3 |
| PT measurement: 1.2% by wt. of activator/ 3.0% by wt. of initiator | time [min] | 7.5 | 7.0 |
| | Tmax [° C.] | 96.1 | 74.2 |
| PT: 0.5% by wt. of activator/ 1.25% by wt. of initiator | time [min] | 23.2 | 17.5 |
| | Tmax [° C.] | 69.1 | 64.9 |
| PT measurement: 0.3% by wt. of activator/ 0.75% by wt. of initiator | time [min] | 47.0 | 38.3 |
| | Tmax [° C.] | 45.0 | 53.0 |

TABLE 3

Comparison of the mechanical properties of Sample 2 as an unfilled and filled system

| | | Sample | |
|---|---|---|---|
| | | 2 Unfilled | 2 Filled with 60% by weight of quartz |
| Shore hardness | D | 18 | 35 |
| | A | 85 | too hard |

The examples show that variation of the resin components, i.e. the use of different methacrylated polyol components, either polyester polyols, polyether polyols or natural polyols, for example castor oil, allows the mechanical properties of the cured resin to be adjusted and varied. Long-chain polyether polyols, for example methacrylated (meth.) Iso-Pol T35, lead to resins with low Shore hardnesses (Sample 7). Short-chain polyether polyols, for example methacrylated Iso-Pol T400 lead, as a result of a higher crosslinking density, to resins with high Shore hardness (Sample 8). In combination with methacrylated castor oil it is thus possible to produce potting compounds with different Shore hardness. Sample 2 shows the decrease in the Shore hardness through use of methacrylated Iso-Pol T35 compared to resins composed of pure methacrylated castor oil (Sample 1). Sample 3 shows the increase in the Shore hardness through use of methacrylated Iso-Pol T400 compared to resins composed of pure methacrylated castor oil (Sample 1).

As Table 2 shows, the polymerization time of the resins is adjustable through the adjustment of the initiator and activator concentration (Samples 3 and 6, Diagrams 1 and 2). If the activator or initiator concentration is reduced, the polymerization time is extended. This enables production of resins with variable processing time according to the end use.

The systems can be used either in unfilled or filled form. With the addition of suitable fillers, the mechanical properties can additionally be influenced (Table 3).

The invention claimed is:
1. A composition prepared from a 2-component system comprising
   a component A) comprising
   b) 0.01-10% by weight of an initiator
   d) 0-90% by weight of a filler
   and a component B) comprising
   a) 9.98-99.98% by weight of the one or more compounds selected from the group consisting of a (meth)acrylated polyether polyol, a (meth)acrylated polyester polyol and a (meth)acrylated hydroxy-functionalized triglyceride
   c) 0.01-10% by weight of an activator
   wherein component B) optionally comprises 0 to 25 wt % of a monofunctional or polyfunctional monomer,
   where the sum of components a) to d) and any optional component must always add up to 100% by weight and the percentages are based on the weight of the overall composition, and
   where one of the following conditions i)-iv) is met:
   i) component a) comprises a (meth)acrylated polyether polyol obtained by transesterification of a polyether polyol having a mean molar mass of 230-8000 g/mol and a hydroxyl number of 10-500 mg KOH/g with a (meth) acrylate;
   ii) component a) comprises:
   a first (meth)acrylated polyether polyol obtained by transesterification of a first polyether polyol having a mean molar mass of 230-650 g/mol and a hydroxyl number of 220-500 mg KOH/g, with a (meth)acrylate, and
   a second (meth)acrylated polyether polyol obtained by transesterification of a second polyether polyol having a mean molar mass of 1000-8000 g/mol and a hydroxyl number of 10-180 mg KOH/g with a (meth)acrylate;

iii) component a) comprises a (meth)acrylated polyester polyol obtained by transesterification of a polyester polyol having a mean molar mass of 500-2000 g/mol and a hydroxyl number of 40-250 mg KOH/g with a (meth)acrylate;
iv) component a) comprises a (meth)acrylated hydroxy-functionalized triglyceride obtained by transesterification of a hydroxy-functionalized triglyceride having a mean molar mass of 800-2000 g/mol and a hydroxyl number of 120-250 mg KOH/g with a (meth)acrylate.

2. A composition prepared from a 2-component system comprising
a component A) comprising
a) 9.98-99.98% by weight of one or more compounds selected from the group consisting of a (meth)acrylated polyether polyol, a (meth)acrylated polyester polyol and a (meth)acrylated hydroxy-functionalized triglyceride
b) 0.01-10% by weight of an initiator
d) 0-90% by weight of a filler
and a component B) comprising
a) 9.98-99.98% by weight of one or more compounds selected from the group consisting of a (meth)acrylated polyether polyol, a (meth)acrylated polyester polyol and a (meth)acrylated hydroxy-functionalized triglyceride
c) 0.01-10% by weight of an activator
wherein component A) and component B) may optionally comprise 0 to 25 wt % of a monofunctional or polyfunctional monomer,
where the sum of components a) to d) and any optional component must always add up to 100% by weight and the percentages are based on the weight of the overall composition, and
where one of the following conditions i)-iv) is met:
i) component a) comprises a (meth)acrylated polyether polyol obtained by transesterification of a polyether polyol having a mean molar mass of 230-8000 g/mol and a hydroxyl number of 10-500 mg KOH/g with a (meth)acrylate;
ii) component a) comprises:
a first (meth)acrylated polyether polyol obtained by transesterification of a first polyether polyol having a mean molar mass of 230-650 g/mol and a hydroxyl number of 220-500 mg KOH/g, with a (meth)acrylate, and
a second (meth)acrylated polyether polyol obtained by transesterification of a second polyether polyol having a mean molar mass of 1000-8000 g/mol and a hydroxyl number of 10-180 mg KOH/2 with a (meth)acrylate;
iii) component a) comprises a (meth)acrylated polyester polyol obtained by transesterification of a polyester polyol having a mean molar mass of 500-2000 g/mol and a hydroxyl number of 40-250 mg KOH/g with a (meth)acrylate;
iv) component a) comprises a (meth)acrylated hydroxy-functionalized triglyceride obtained by transesterification of a hydroxy-functionalized triglyceride having a mean molar mass of 800-2000 g/mol and a hydroxyl number of 120-250 mg KOH/g with a (meth)acrylate.

3. The composition of claim 1, wherein component a) further comprises 1-1000 ppm of a stabilizer, based on the total amount of component a).

4. The composition of claim 1, comprising
50-85% of component A and
15-50% of component B.

5. The composition of claim 1,
wherein component a) comprises a (meth)acrylated polyether polyol obtained by transesterification of a polyether polyol having a mean molar mass of 230-8000 g/mol and a hydroxyl number of 10-500 mg KOH/g with a (meth)acrylate.

6. The composition of claim 1, wherein component a) comprises:
a first (meth)acrylated polyether polyol obtained by transesterification of a first polyether polyol having a mean molar mass of 230-650 g/mol and a hydroxyl number of 220-500 mg KOH/g, with a (meth)acrylate, and
a second (meth)acrylated polyether polyol obtained by transesterification of a second polyether polyol having a mean molar mass of 1000-8000 g/mol and a hydroxyl number of 10-180 mg KOH/g with a (meth)acrylate.

7. The composition of claim 1, wherein component a) comprises a (meth)acrylated polyester polyol obtained by transesterification of a polyester polyol having a mean molar mass of 500-2000 g/mol and a hydroxyl number of 40-250 mg KOH/g with a (meth)acrylate.

8. The composition of claim 1, wherein component a) comprises a (meth)acrylated hydroxy-functionalized triglyceride obtained by transesterification of a hydroxy-functionalized triglyceride having a mean molar mass of 800-2000 g/mol and a hydroxyl number of 120-250 mg KOH/g with a (meth)acrylate.

9. The composition of claim 1, wherein component a) comprises a (meth)acrylated hydroxy-functionalized triglyceride that is (meth)acrylated castor oil.

10. A watertight compound resistant to electrical breakdown in cavities, the watertight compound comprising the composition of claim 1.

11. A potting compound comprising the composition of claim 1, wherein the potting compound is suitable for sealing electrical cables.

12. The composition of claim 1, wherein component a) comprises a mixture of at least two different (meth)acrylated compounds.

13. The composition of claim 2, wherein component a) comprises a mixture of at least two different (meth)acrylated compounds.

14. The composition of claim 2, comprising 50-85% of component A and 15-50% of component B.

15. The composition of claim 2, wherein component a) further comprises 1-1000 ppm of a stabilizer, based on the total amount of component a).

16. The composition of claim 2,
wherein component a) comprises a (meth)acrylated polyether polyol obtained by transesterification of a polyether polyol having a mean molar mass of 230-8000 g/mol and a hydroxyl number of 10-500 mg KOH/g with a (meth)acrylate.

17. The composition of claim 2, wherein component a) comprises:
a first (meth)acrylated polyether polyol obtained by transesterification of a first polyether polyol having a mean molar mass of 230-650 g/mol and a hydroxyl number of 220-500 mg KOH/g, with a (meth)acrylate, and
a second (meth)acrylated polyether polyol obtained by transesterification of a second polyether polyol having a mean molar mass of 1000-8000 g/mol and a hydroxyl number of 10-180 mg KOH/g with a (meth)acrylate.

18. The composition of claim 2, wherein component a) comprises a (meth)acrylated polyester polyol obtained by transesterification of a polyester polyol having a mean molar mass of 500-2000 g/mol and a hydroxyl number of 40-250 mg KOH/g with a (meth)acrylate.

19. The composition of claim 2, wherein component a) comprises a (meth)acrylated hydroxy-functionalized triglyceride obtained by transesterification of a hydroxy-functionalized triglyceride having a mean molar mass of 800-2000 g/mol and a hydroxyl number of 120-250 mg KOH/g with a (meth)acrylate.

20. The composition of claim 2, wherein component a) comprises a (meth)acrylated hydroxy-functionalized triglyceride that is (meth)acrylated castor oil.

21. A watertight compound resistant to electrical breakdown in cavities, the watertight compound comprising the composition of claim 2.

22. A potting compound comprising the composition of claim 2, wherein the potting compound is suitable for sealing electrical cables.

23. The composition of claim 1, wherein said monofunctional or polyfunctional monomer is selected from the group consisting of a vinylically unsaturated compound, a hydroxyalkyl (meth)acrylate, a glycol dimethacrylate, a methacrylate of an ether alcohol, styrene, a substituted styrene having an alkyl substituent in the side chain, a substituted styrene having an alkyl substituent on the ring, and a halogenated styrene.

24. The composition of claim 23, wherein said monofunctional or polyfunctional monomer is a vinylically unsaturated compound is selected from the group consisting of methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, ethylhexyl (meth)acrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, and 3,3,5-trimethylcyclohexyl (meth)acrylate.

25. The composition of claim 2, wherein said monofunctional or polyfunctional monomer is selected from the group consisting of a vinylically unsaturated compound, a hydroxyalkyl (meth)acrylate, a glycol dimethacrylate, a methacrylate of an ether alcohol, styrene, a substituted styrene having an alkyl substituent in the side chain, a substituted styrene having an alkyl substituent on the ring, and a halogenated styrene.

26. The composition of claim 25, wherein said monofunctional or polyfunctional monomer is a vinylically unsaturated compound is selected from the group consisting of methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, ethylhexyl (meth)acrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, and 3,3,5-trimethylcyclohexyl (meth)acrylate.

\* \* \* \* \*